United States Patent

[15] 3,653,264

Mills

[45] Apr. 4, 1972

[54] APPARATUS FOR DETECTING A LEAK IN A FLUID PRESSURE SYSTEM

[72] Inventor: Albert E. Mills, 10 Cloisters Road, Letchworth, England

[22] Filed: Nov. 25, 1969

[21] Appl. No.: 879,789

[30] Foreign Application Priority Data

Nov. 25, 1968 Great Britain......................56,146/68

[52] U.S. Cl. ..........................................73/398 R, 73/49.2
[51] Int. Cl. .......................................................G01l 9/04
[58] Field of Search..........................73/49.2, 40, 398; 92/38

[56] References Cited

UNITED STATES PATENTS

| | | | |
|---|---|---|---|
| 3,039,295 | 6/1962 | Le Matt et al. ..........................73/49.2 |
| 2,989,084 | 6/1961 | Jones.........................................93/38 |
| 3,461,726 | 8/1969 | Ziegler.....................................73/398 |
| 2,959,963 | 11/1960 | Watrous.................................92/38 X |
| 3,472,077 | 10/1969 | Bucalo..................................73/398 X |

Primary Examiner—Louis R. Prince
Assistant Examiner—William A. Henry, II
Attorney—Cullen, Settle, Sloman & Cantor

[57] ABSTRACT

A fluid-pressure differential cell wherein pressure is transmitted between the two sides of the cell internally thereof by means of a liquid medium.

The liquid may be contained between spaced apart diaphragms so that pressure applied to one diaphragm is transmitted to the other. In a preferred cell of the present invention, providing an amplification of the signal produced by the pressure difference, the two diaphragms are bellows diaphragms, one of a greater cross-sectional area than the other, between which liquid passes on the development of a pressure difference between the two sides of the cell, so that the amplified signal is constituted by an expansion of the bellows diaphragm of narrower cross-section, over a greater axial distance than the other bellows diaphragm is contracted by that pressure difference.

The bellows diaphragms may be separated by a chamber connecting the internal spaces of the two diaphragms, and the chamber may be formed with an access port for filling the chamber and the internal spaces of the bellows diaphragms with the liquid which, preferably, is a light oil.

9 Claims, 5 Drawing Figures

PATENTED APR 4 1972

INVENTOR
ALBERT E MILLS

ATTORNEY

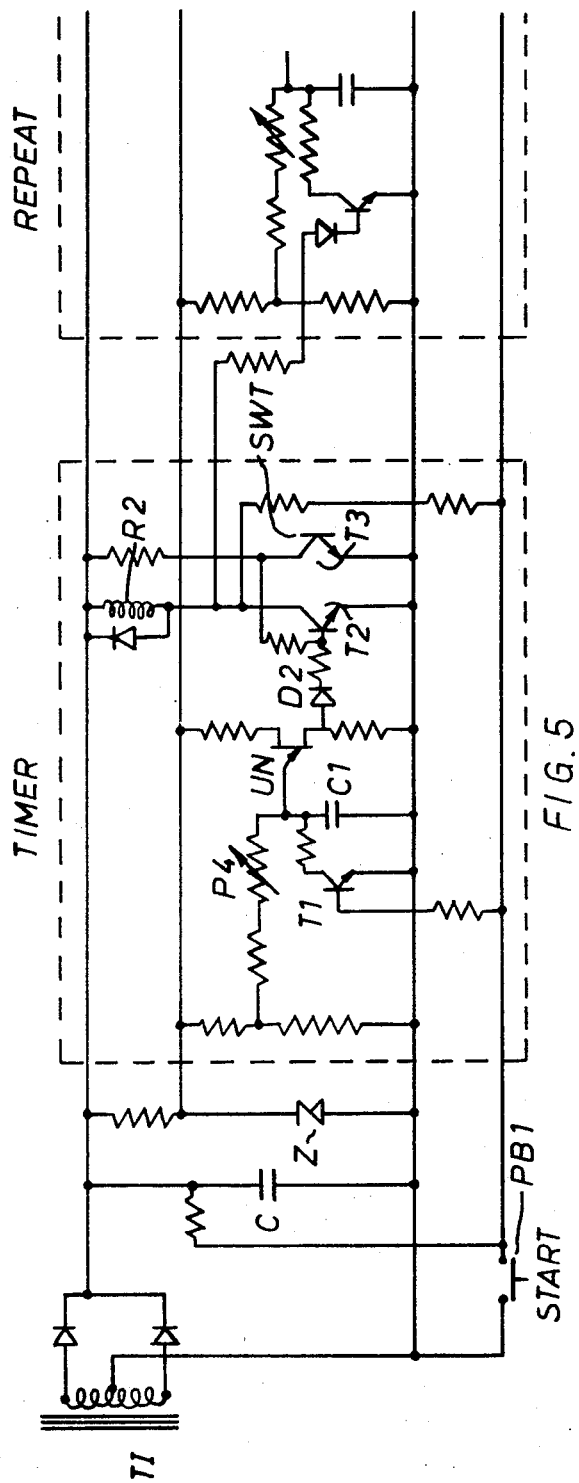

APPARATUS FOR DETECTING A LEAK IN A FLUID PRESSURE SYSTEM

The present invention relates to a fluid-pressure differential cell and to a leak-detection system employing such cell.

Fluid-pressure differential cells for use in leak-detection systems are known including those which provide an amplification of a signal produced by a pressure difference between the two sides of the cell and which, by that means, increase the sensitivity of the cell. Existing cells, however, whether those providing an amplification or not, are not entirely consistent in operation especially at pressure differences of less than 0.0001 p.s.i.

It is an object of the present invention to provide a fluid-pressure differential cell of consistent operation.

It is also an object of the present invention to provide such cell which because of its consistent operation, enables relatively simple apparatus to be used to produce an indication of the magnitude of the pressure difference detected by the cell.

The present invention also provides a leak-detection system comprising a cell according to the invention, and means for providing an indication of the magnitude of the signal produced by the pressure difference.

In the case where the cell employed is one providing an amplification of the signal, the system may comprise a transducer for converting the amplified signal into an electrical signal, an electronic amplifier circuit for amplifying the electrical signal, and an indicator for indicating the magnitude of the amplified electrical signal.

The amplifier circuit preferably comprises a first amplifier for directly amplifying the electrical signal from the transducer, and a comparator amplifier receiving the output of the first amplifier and such as to produce an output signal when the output of the first amplifier exceeds a predetermined value. The first amplifier may comprise a feedback loop having a limiter therein to limit the output fed to the comparator amplifier.

The system employing the above-described amplifier circuit may further comprise an input to the first amplifier, having a potentiometer, a servo amplifier, a switch by means of which the output of the first amplifier can be switched to the servo amplifier, and a servo motor driven by the servo amplifier and connected to the potentiometer so that when an output is obtained from the first amplifier and that amplifier is switched to the servo amplifier, the servo motor is driven to adjust the potentiometer so as to zero the output of the first amplifier. This provisional for zeroing the system is important for compensating for the effect of temperature changes between successive tests. Thus, if the apparatus is assumed to be calibrated to zero at the time of one test, temperature changes alone could cause the amplifier to produce an output by the time a next test is effected; and the system, therefore, needs to have provision for referring the system to a preset datum before each test measurement is effected, in circumstances in which intolerable temperature changes are likely to take place.

In the system employing the above-described amplifier circuit, the cell may be arranged with the two sides thereof connected externally of the cell by a conduit having therein a leak-proof valve; and to control operation of the system, there may be used an electronic timing circuit such that when the two sides of the cell have been brought to the test pressure and the timing circuit activated, the timing circuit automatically causes the leak-proof valve to close and the first amplifier output first to be switched to the servo amplifier and then to the comparator amplifier, and thereafter, following the lapse of a predetermined time, the leak-proof valve to open and the first amplifier to be switched back from the comparator amplifier.

The timing circuit may comprise a capacitor the discharging and charging of which effects the timing provided by the circuit. The capacitor may be employed to control, by the charge thereon, the conduction of a unijunction, and the unijunction employed to control a transistor switch arrangement so that when the unijunction is rendered conducting, the transistor switch arrangement causes the first amplifier to be switched to the servo amplifier, the leak-proof valve to close, and the first amplifier then to be switched to the comparator amplifier, and so that when the unijunction is rendered non-conducting the transistor switch arrangement is caused to restore the status quo ante.

If a number of timing circuits are employed to control different acts of apparatus, they may be formed together as parts of a single circuit entity.

The transducer employed with the amplifier circuit may be a strain-wire gauge or a linear differential transformer. Where a limit of magnitude is to be indicated, the indicating means may comprise switch contacts operated by diaphragm movement in the cell, to operate indicator lights.

The present invention will now be described, by way of example only, with reference to the accompanying drawings, in which:

FIG. 5 is a diagram of timing circuit employed in the system of FIG. 3.

Figure 1:
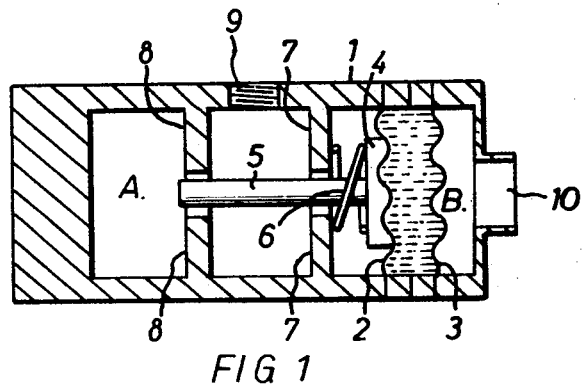
FIG. 1 is a diagram of a longitudinal section of a first fluid-pressure differential cell of the present invention.

Referring to the drawings, it may be seen from FIG. 1 that the illustrated cell comprises a hollow body 1 divided into a chamber A and a chamber B by two diaphragms 2, 3. The two diaphragms are spaced apart and the space between them is filled with liquid through a plugged orifice (not shown) in the body 1. The diaphragm 2, by means of a plate 4, has secured thereto an actuator rod 5 about which is mounted a compression spring 6 to impart a bias force to the diaphragms to enable them to withstand the pressures to which they are submitted in use of the cell. The spring at one end abuts against the plate 4 and at the other end against a pair of opposite flanges 7 integral with body 1. A further like pair of flanges 8 are provided. The two sets of flanges carry bushes (not shown) which act as bearings for the actuator rod. The body 1 also provides an aperture 9 for connection of chamber B, by a conduit, to a vessel to be tested, and an aperture 10 for connection of chamber A by a conduit, to the source of test pressure to be employed.

In use of the cell, a pressure difference between the two sides of cell (i.e., between chamber A and chamber B) displaces the diaphragms, with pressure being transmitted between the two diaphragms by the liquid, and this displacement constitutes a signal of the pressure difference. Displacement of the diaphragms causes displacement of the actuator rod 5, which in turn is employed to operate switch contacts (not shown) controlling indicator lights. If the rod is displaced by or more than a predetermined distance, switch contacts are operated to illuminate a light signifying that the pressure difference detected has exceeded a predetermined magnitude whereas if the rod is not displaced by that distance, a further light is illuminated after a suitable interval, to signify that the pressure difference is within the predetermined magnitude.

Figure 2:
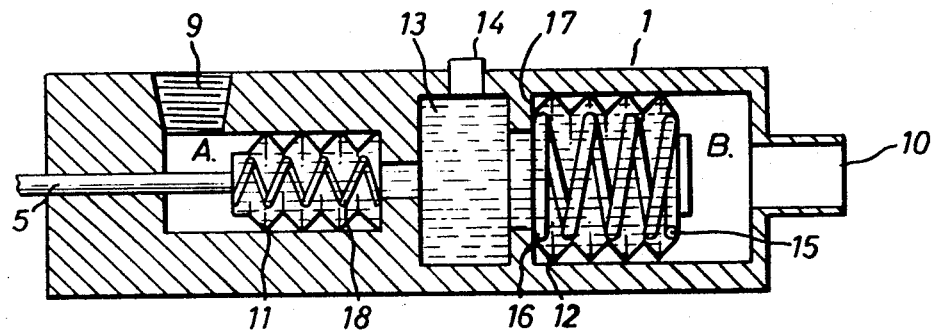
FIG. 2 is a like diagram of a second cell according to the present invention.

The cell of FIG. 2 is one providing an amplification of the signal produced by a pressure difference between the two sides of the cell but is generally similar to that of FIG. 1 with like parts in the two Figures being indicated by the same reference numerals. In the cell of FIG. 2, however, the two diaphragms 11, 12 provided are bellows diaphragms, with diaphragm 11 of lesser cross-sectional area than diaphragm 12, between which the liquid passes on the development of a pressure difference between the two sides of the cell so that the amplified signal is constituted by an expansion of diaphragm 11 over a greater axial distance than the diaphragm 12 is contracted by the pressure difference. The two diaphragms are separated by a chamber 13 connecting the internal spaces of the two diaphragms, and the chamber provides and access port 14 for filling the chamber and the internal spaces of the diaphragms with the liquid.

Diaphragm 12 has secured thereto a compression spring 15 so that as the diaphragm contracts, the spring is compressed with one end 16 of the spring abutting against a wall 17 of the chamber 13; and the diaphragm 11 carries a tension spring 18 so that as the diaphragm is expended, the spring is tensioned. The two springs serve the like purpose to the spring 6 of FIG. 1.

The actuator rod 5 of the cell of FIG. 2 is passed through a bore in body 1 to extend exteriorly thereof to operate a transducer as explained hereinafter.

Figure 3:
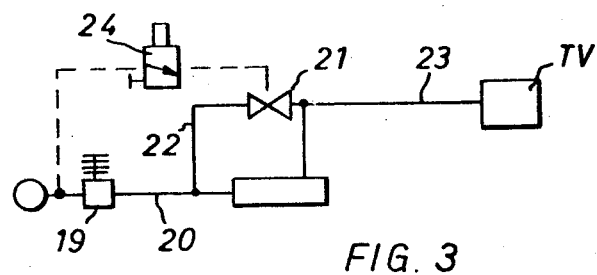
FIG. 3 is a diagram of part of a leak-detection system according to the present invention; the part comprising the pneumatic connections of the fluid-pressure differential cell employed to the source of test pressure and to the vessel to be tested respectively.

In employing either of the cells described above in the embodiment of FIG. 3, chamber B is connected through a precision pressure regulator 19 by a conduit 20 to a source of fluid-pressure (usually air), and chamber A is connected to chamber B externally of the cell and to the pressure regulator through a conventional leak-proof valve 21 by a conduit 22 and a conduit 20. Chamber A is also connected to the vessel TV to be tested for a leak, by a conduit 23. The valve 21 is controlled by a solenoid operated valve 24 which when open, passes fluid from the source of fluid pressure, to the valve 21 to close the latter. Conversely, when valve 24 is closed, the fluid pressure closing valve 21 is vented to cause the valve to open.

In preparing the apparatus for carrying out a leak test, valve 21 is first closed, while chamber B is brought to the test pressure as set by regulator 19. Chamber B is, thereafter, maintained at that pressure for as long as the vessels to be tested are to be tested at that pressure. In carrying out the test of a vessel, the valve 21 is then opened and the test vessel and chamber A also brought to test pressure. The valve 21 is then again closed following a suitable delay to allow the system to "settle down," and following a further predetermined interval, any movement of the actuator rod 5 is detected and measured as will be explained below, to establish whether a leak is present and, if so, of what magnitude.

Figure 4:
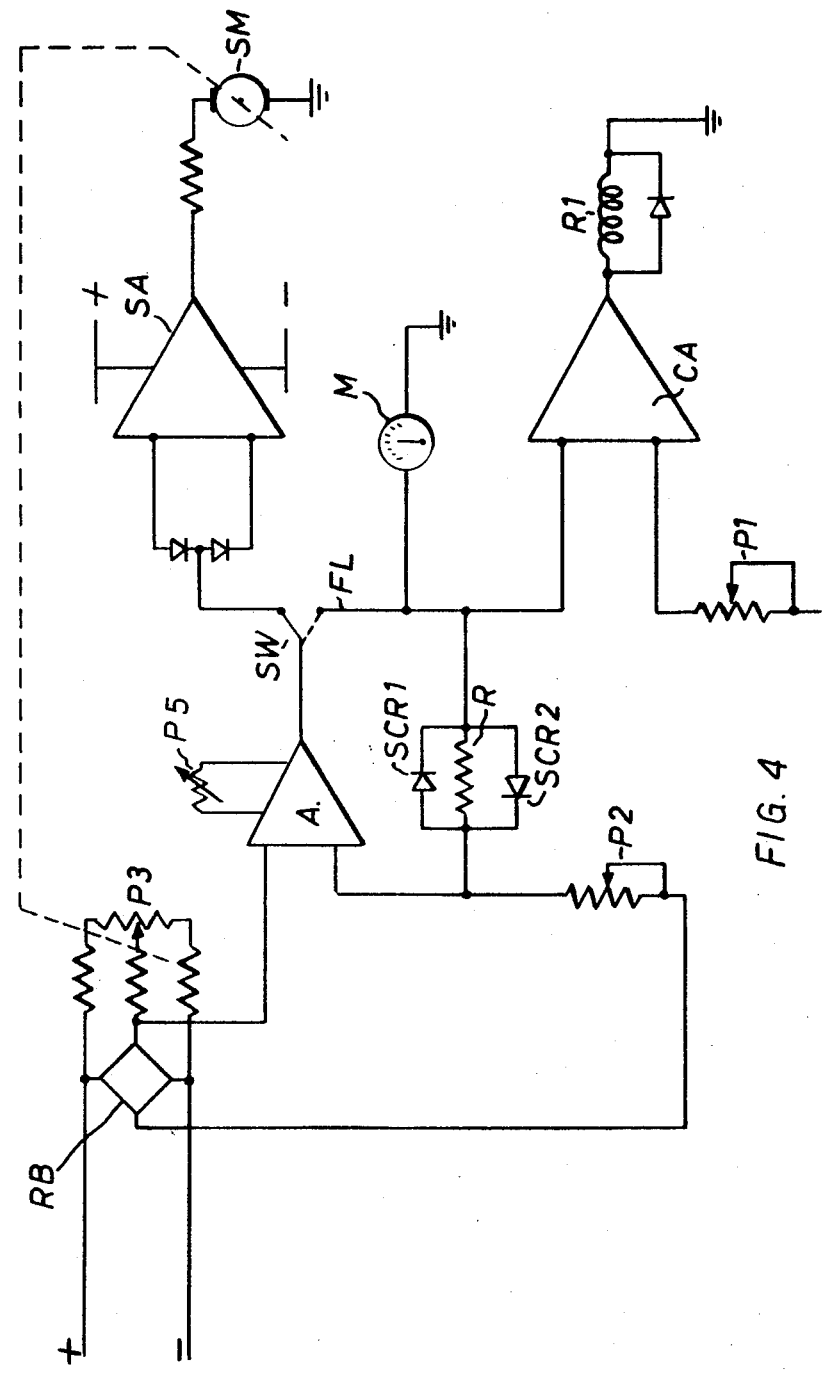
FIG. 4 is a block diagram of an electronic amplifier circuit employed in the system of FIG. 3.

The movement of the actuator rod 5 is sensed by a transducer, generally indicated at RB, such as a strain-wire gauge or a linear differential transformer, and the electrical signal obtained thereby amplified to produce a meter reading by the amplifier circuit shown in FIG. 4. This circuit comprises a first amplifier A and a comparison amplifier CA arranged to receive as one input, the output of the first amplifier and as a second input, a predetermined voltage set by a potentiometer P1 so as to produce an output signal when the output of the first amplifier exceeds the predetermined voltage, to provide an indication that the predetermined voltage set by the potentiometer P1 has been exceeded. Simultaneously a reading of an indicator constituted by a meter M, is produced. To provide the above-mentioned indication, the output signal of the amplifier CA, is used to operate a relay R1 to switch in a light (not shown). The amplifier A is provided with a feedback loop FL, having a limiter therein constituted by two silicon controlled diodes SCR1 and 2, connected back to back across a resistor R, to limit the output fed to the meter. The gain produced by the amplifier A is controlled by a potentiometer P2.

The circuit further comprises, in the input to amplifier A, a potentiometer P3, a servo amplifier SA, a switch SW by means of which the output of the first amplifier can be switched to the servo amplifier, and a servo motor SM driven by the servo amplifier and connected to the potentiometer P3, as indicated by the broken lines SMS, so that when an output is obtained from the first amplifier, and the first amplifier is switched to the servo amplifier, the servo motor is driven to adjust the potentiometer P3 so as to "zero" (i.e., return to a preset starting value) the output of the first amplifier.

The zeroing is effected by switching the amplifier A output to the servo amplifier for a brief period (say, 4 seconds) after valve 21 is closed. This calibration takes into account in any one test, any temperature variations that might have taken place since the last test, and ensures that readings are taken from a preset datum.

The operation of the system is controlled by the timing circuit shown in FIG. 5 by the word "Timer." The circuit comprises a capacitor C1 the discharging and charging of which effects the timing provided by the circuit. The capacitor C1 is charged, through a transistor T1, from a rectified supply the voltage of which is limited by a Zener diode Z, obtained from a transformer input T1 and smoothed by a capacitor C.

The capacitor C1 is employed to control, by the charge thereon, the conduction of a unijunction UN, namely, the switch the unijunction on when discharged and to switch it off when charged, and the unijunction, in turn, is employed to control a transistor switch arrangement SWT so that when the unijunction is rendered conducting the transistor switch arrangement causes the leak-proof valve to close and the first amplifier first to be switched to the servo amplifier and then to the comparator amplifier, and so that when the unijunction is rendered non-conducting the transistor switch arrangement is caused to restore the status quo ante. Actuation of the circuit to operate in the above-described manner is effected by closing the press-button switch PB1.

It will be seen from this that the timing circuit provides a predetermined period for zeroing the test system, and a predetermined period for effecting a measurement of the actuator rod movement (if any). The timing circuit causes operation of the valve 21 through solenoid valve 24. So that the time of both the above-mentioned periods may be varied, the circuit comprises a potentiometer P4 by which the rate of charging and discharging of the capacitor C1 can be varied. The circuit of amplifier A also includes a potentiometer P5 to provide bias to enable a "zero" adjustment of the amplifier itself readily to be made.

The transistor switch arrangement comprises a pair of transistors T2 and T3. The base of T2 is connected through diode D2 to the base 2 electrode of the unijunction, and to the collector of T3 so that when the unijunction conducts, the bias is removed from the base of T2 to switch it off, and a potential applied across the emitter and collector of T3 to switch it on and so that when the unijunction ceases to conduct, the bias is re-applied to T2 to switch it on, and the conducting potential removed from T3 to switch it off. When the two transistors switch, a relay B2 in the collector circuit of T2 operates to provide the actuation for operating the solenoid valve 24 and the switch SW.

The component values shown in FIG. 5 provide a timing period of up to 15 minutes depending on the setting of the potentiometer P4. Timing periods greater than this, may be achieved by changing component values accordingly.

In certain applications, a number of the systems as above-described may be used at adjacent stations, and in this case, the plurality of timing circuits employed instead of being separately formed entities, may be formed together as a single circuit entity. Thus, the timing circuit may be repeated as indicated by the part circuit identified in FIG. 5 by the word "Repeat."

I claim:

1. A leak detection system comprising a fluid pressure differential cell including a chamber having opposed sides and filled with a liquid, the cell being operable when differential pressures are transmitted to opposite sides of the liquid-filled chamber to produce a signal of the pressure difference; and means for providing an indication of the magnitude of the signal, said means including a transducer for converting the signal to an electrical signal, an electronic amplifier circuit for amplifying the electrical signal, said amplifier circuit including a first amplifier for directly amplifying the electrical signal for the transducer, and a comparator amplifier for receiving the output of the first amplifier and operable to produce an output signal when the output of the first amplifier exceeds a predetermined value, and an indicator for indicating the magnitude of the amplitude electrical signal.

2. A system according to claim 1, wherein the transducer is a linear differential transformer.

3. A system according to claim 1, wherein the first amplifier comprises a feedback loop having a limiter therein to limit the output fed to the indicator.

4. A system according to claim 1, wherein the system further comprises an input to the first amplifier, having a potentiometer, a servo amplifier, a switch by means of which the output of the first amplifier can be switched to the servo amplifier and a servo motor driven by the servo amplifier and connected to the potentiometer so that when an output is obtained from the first amplifier and that amplifier is switched to the servo amplifier, the servo motor is driven to adjust the potentiometer so as to zero the output of the first amplifier.

5. A system according to claim 1, wherein the two sides of the cell are connected externally of the cell by a conduit having therein a leak-proof valve; and wherein the system comprises an electronic timing circuit such that when the two sides of the cell have been brought to test pressure and the timing circuit activated, the timing circuit automatically causes the leak-proof valve to close and the first amplifier output first to be switched to the servo amplifier and then to the comparator amplifier, and thereafter, following the lapse of a predetermined time interval, the leak-proof valve to open and the first amplifier to be switched back from the comparator amplifier.

6. A system according to claim 5, wherein the timing circuit comprises a capacitor the discharging and charging of which effects the timing provided by the circuit.

7. A system according to claim 6, wherein the capacitor is employed to control, by the charge thereon, the conduction of a unijunction, and the unijunction is employed to control a transistor switch arrangement so that when the unijunction is rendered conducting, the transistor switch arrangement causes the leak-proof valve to close and the first amplifier to be switched first to the servo amplifier and then to the comparator amplifier, and so that when the unijunction is rendered non-conducting, the transistor switch arrangement is caused to open the leak-proof valve.

8. A system according to claim 5, wherein the fluid-pressure differential cell together with the transducer, amplifier circuit and timing circuit is provided in plurality; and wherein the plurality of timing circuits are formed together as parts of a single circuit entity.

9. A system according to claim 1, wherein the transducer is a strain-wire gauge.

* * * * *